Jan. 22, 1952     G. W. EMMERT ET AL     2,583,093
APPARATUS FOR MAKING CLOSURES FOR CONTAINERS
Filed Jan. 26, 1949     4 Sheets-Sheet 3
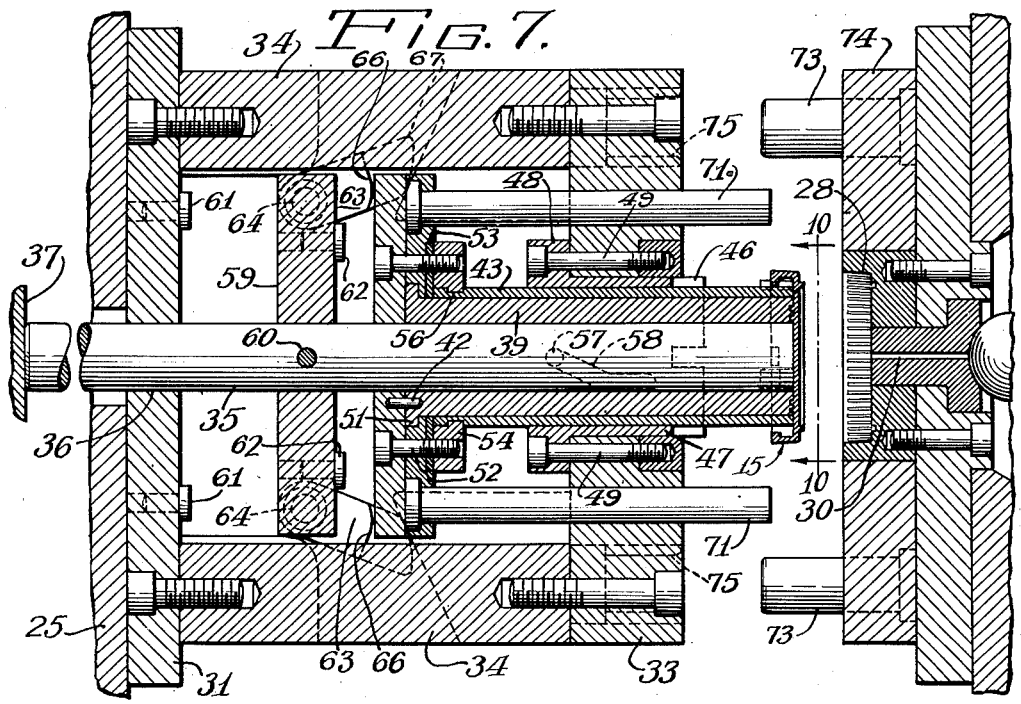
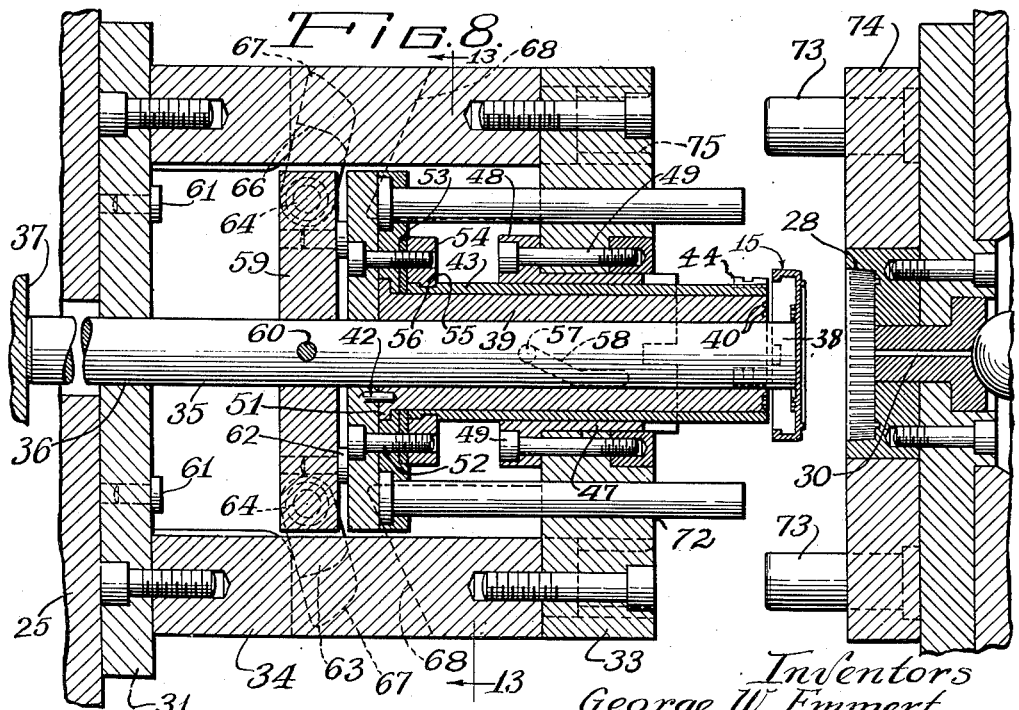
Inventors
George W. Emmert
Raymond J. Olson
By Glenn S. Noble Atty.

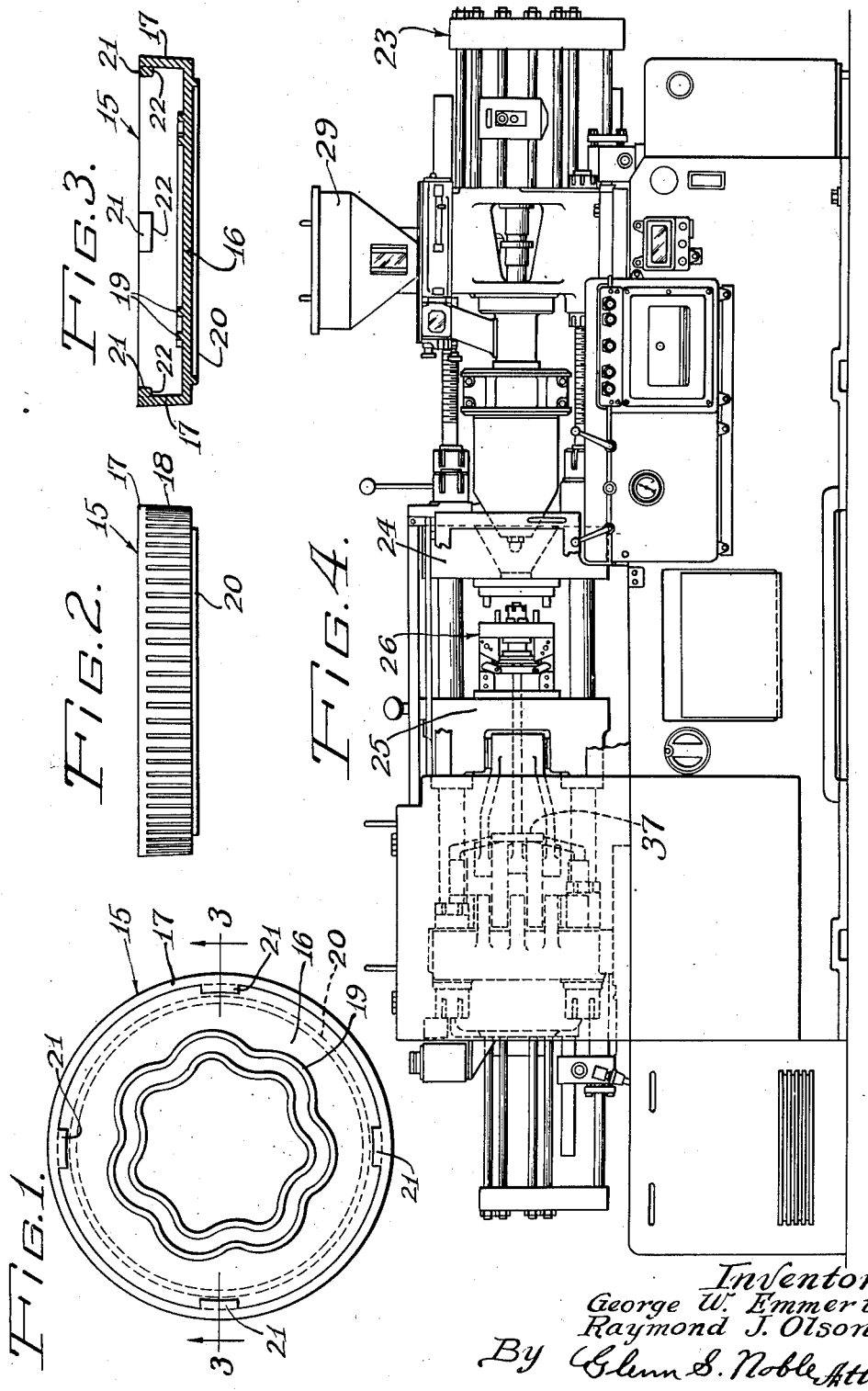

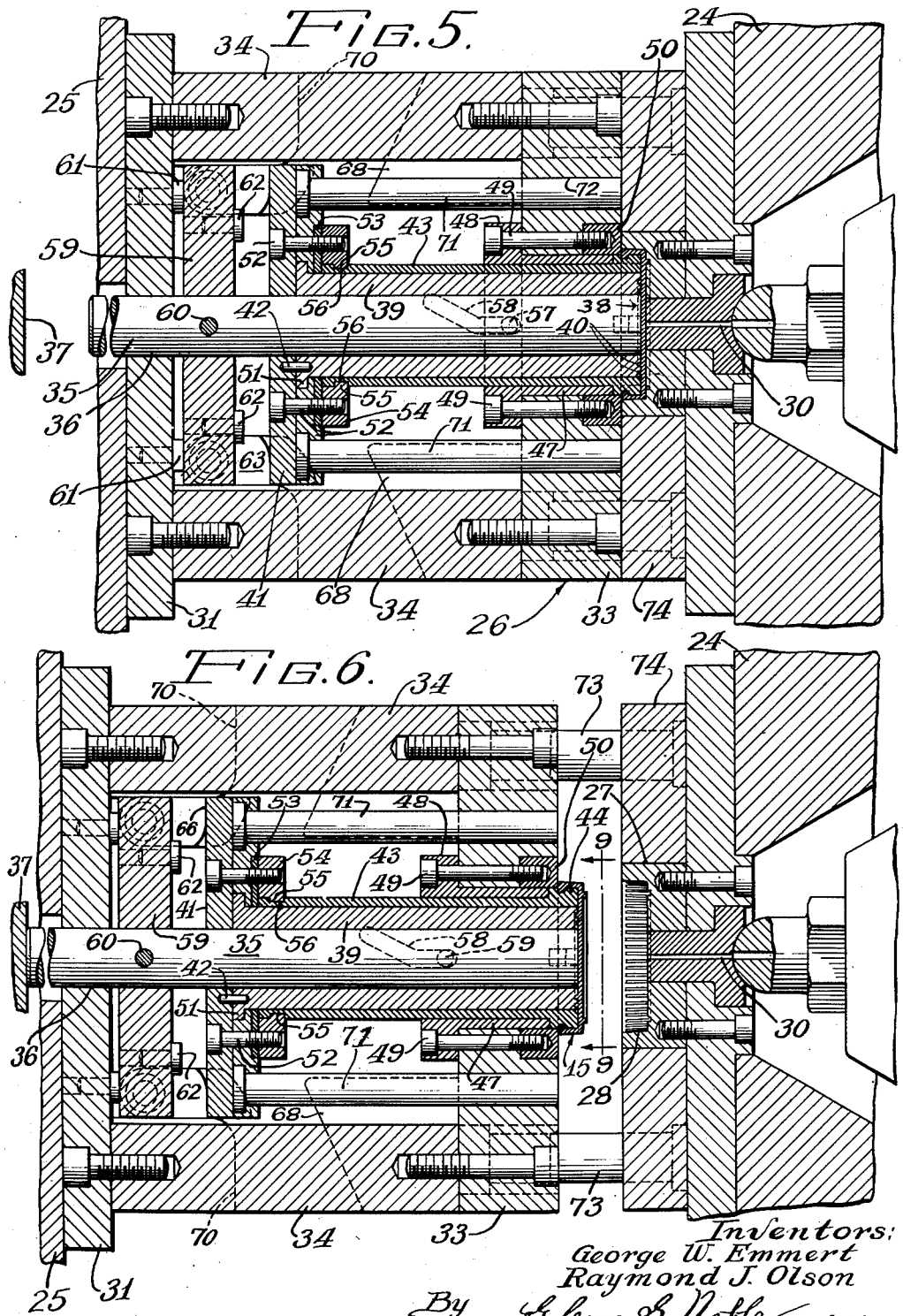

Jan. 22, 1952  G. W. EMMERT ET AL  2,583,093
APPARATUS FOR MAKING CLOSURES FOR CONTAINERS
Filed Jan. 26, 1949  4 Sheets-Sheet 4
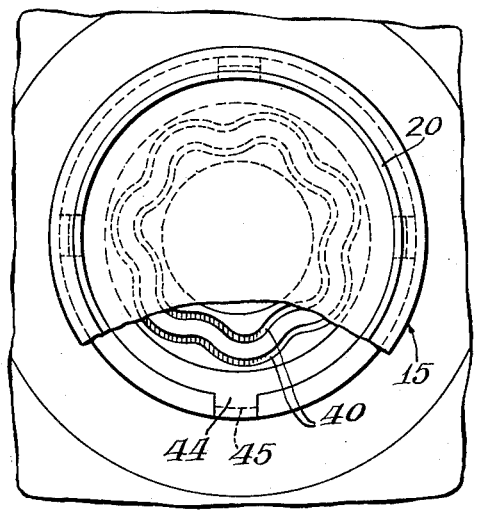
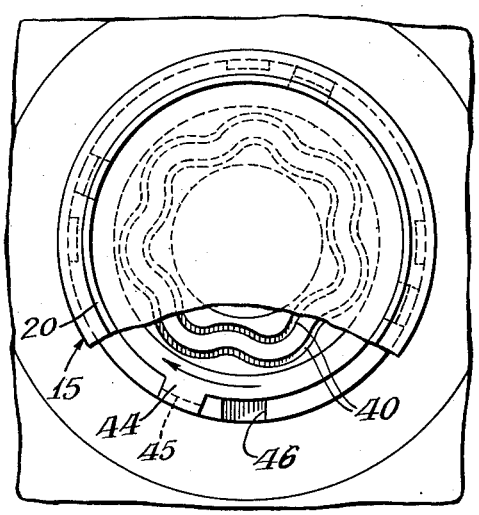
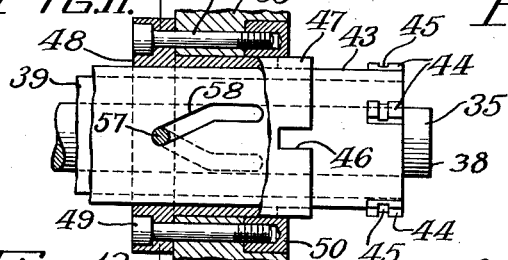
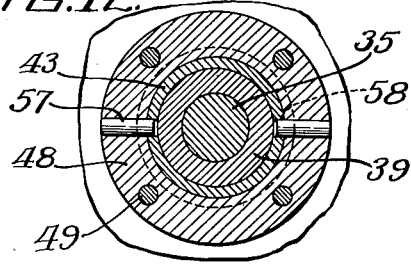
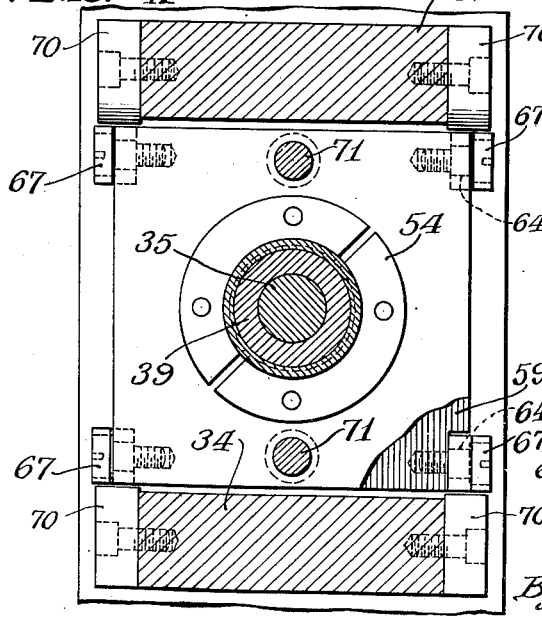
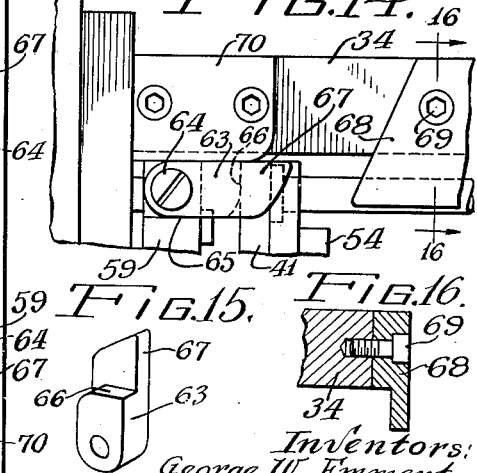
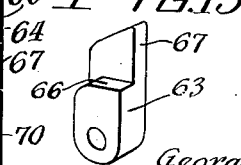
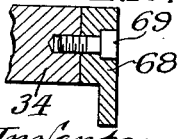
Inventors:
George W. Emmert
Raymond J. Olson
By Glenn S. Noble Atty.

Patented Jan. 22, 1952

2,583,093

UNITED STATES PATENT OFFICE 2,583,093

APPARATUS FOR MAKING CLOSURES FOR CONTAINERS

George W. Emmert and Raymond J. Olson, Lincolnwood, Ill., assignors to Federal Tool Corporation, Lincolnwood, Ill., a corporation of Illinois Application January 26, 1949, Serial No. 72,918

4 Claims. (Cl. 18—30)

This invention relates to the manufacture of closures for containers such as caps for jars, or the like, by injection molding of any suitable plastics. It is particularly directed to the manufacture of caps or closures having lugs or interrupted threads projecting inwardly from the rims although it may be applicable to making various forms of such devices.

The objects of this invention are to provide an improved molding machine for making articles of plastic material with novel molds which may be manipulated in order to release the completed article; to provide molds for an injection molding machine with means for actuating one of the mold members relative to the other to release the article formed; and to provide such further novel features and improvements as will appear more fully hereinafter.

In the accompanying drawings illustrating this invention,

Fig. 1 is a bottom plan view of a particular form of cap or closure to be made in accordance with this invention;

Fig. 2 is a side view of the same;

Fig. 3 is a sectional view taken on the line 3—3 of Fig. 1;

Fig. 4 is a side view of an injection molding machine of well known construction provided with our improved molds;

Fig. 5 is an enlarged longitudinal sectional view of the molds and adjacent parts of the machine with the cap in position in the molds;

Fig. 6 is a view similar to Fig. 5 showing some of the movable mold members in retracted position with the cap removed from the mold cavity;

Fig. 7 is a view similar to Fig. 5 showing one of the inner core members turned or rotated to release the cap;

Fig. 8 is a view similar to Fig 5 showing the final movement of the movable core members to release the formed cap;

Figs. 9 and 10 are details illustrating the rotation of the inner die or mold member with respect to the coacting members in order to release the cap from the lug forming portions of said inner member;

Figs. 11 and 12 are details of the coacting die members illustrating the means for turning the innermost member;

Fig. 13 is a vertical sectional detail taken substantially on the line 13—13 of Fig. 8;

Fig. 14 is a detail of the dogs or actuating members for actuating some of the movable parts of the mold at predetermined times;

Fig. 15 is a perspective view of one of the dogs; and

Fig. 16 is a detail of one of the cams.

While our invention may be utilized for making various devices, it is particularly directed to making caps or closures for containers such as shown in Figs. 1 to 3 by injection molding of suitable plastic materials. This closure or jar cap 15 has a top 16 with a downwardly projecting annular flange 17 which is preferably corrugated on the outside as shown at 18. The top has one or more downwardly projecting annular or fluted beads 19 which serve to hold the cap from turning when it is being removed from the mold. It also has an upwardly projecting annular rib 20. The rim 17 has a plurality of inwardly extending lugs or interrupted thread members 21 around the lower edge thereof, the upper faces 22 of these lugs being preferably tapered for engagement with threads or fastening members on the jar. It is these inwardly projecting lugs on the caps that complicate the molding process, and it is the making of the caps with such inwardly extending lugs in a rapid and efficient manner that constitutes the principal feature of the present method and apparatus.

The injection molding machine 23 illustrates a well known commercial form of such apparatus which is provided with the usual operating and controlling mechanism and does not need to be described in detail. It has a front stationary die plate 24 and a rear movable die plate 25, the latter being operated by the toggle mechanism of the machine. Our improved mold 26 is interposed between these plates and coacts therewith. The stationary die member 27 is secured to the front die plate in any suitable manner as shown and contains a cavity 28 which corresponds in shape to the finished contour of the outer surfaces of the cap 15 to be made therein. The plastic to be used is placed in the hopper 29 of the machine and is injected into the mold by the mechanism provided for such purposes and enters the mold through an orifice 30 which may enter the front of the mold as shown or may enter the side or face of the mold as will be more common where multiple cavities are provided. The movable mold members are carried by a platen 31 which is secured to the die plate 25 in any suitable manner.

The platen 31 is connected to a front plate 33 by connecting members or bars 34, these parts being secured together in any suitable manner as by means of screws as shown, thus forming a carriage for the movable mold members. A rod or shaft 35 is slidably mounted in a bearing 36 in the platen 31, and its inner end is adapted to engage at times with a fixed ejector plate 37 forming a part of the machine. The front end 38 of the shaft is adapted to enter the cavity and forms a portion of the wall of the mold as shown in Figs. 5 and 6. A sleeve 39 fits over the shaft 35, the front end of the sleeve being flush with the end of the shaft and forming an annular wall of the inner mold. This sleeve has irregular shaped grooves 40 which are adapted to form the beads 19 on the cap, the non-circular shape of such grooves serving to prevent the turning of the cap when the cap is to be removed therefrom. This sleeve is fixed to a transverse plate 41 being prevented from turning by the dowel pins 42. The plate 41 is slidably mounted on the shaft 35. Another sleeve or mold member 43 is rotatably mounted on the sleeve 39 with the front end thereof flush with the end of said sleeve. This member has a plurality of outwardly extending lugs or projections 44 at its forward end, these lugs being of the same width as the lugs 21 of the cap and are provided with transverse grooves or recesses 45 which receive the material for forming the lugs 21.

In order to confine the material in the grooves 45, these lugs coact with recesses 46 in the end of the tube 47 which fits closely over the sleeve 39 as best shown in Fig. 11. When the mold is closed, the end of the tube 47 is flush with the end of the sleeve and the sides of the slots close the ends of the grooves 45, thus providing mold cavities for receiving the molding material to make the lugs 21. The tube 47 has an outwardly extending flange 48 which engages with the front plate 33, and the tube is secured to such plate by means of bolts 49 which extend through the plate and engage with threaded holes in a ring 50 which is let into the plate. This ring fits closely over the inner ends of the lugs 44 when the mold is closed as shown in Fig. 5 and constitutes the outer portion of the mold closure for the cavity 28 as shown in Fig. 5. The sleeve 39 has a flange 51 at its inner end which fits against the face of the plate 41 and is countersunk in a plate 52 which is coextensive with the plate 41. These plates are held together by bolts 52 which extend therethrough and through a washer member 53 and engage with threaded holes in a split ring 54. This ring has an inwardly extending flange 55 which fits in annular grooves 56 in the outer periphery of the sleeve or mold member 43 as shown in Fig. 5.

The flange 48 of the tube 47 is provided with two inwardly extending pins 57 which engage with oppositely disposed slots 58 in the sleeve or mold member 43 as shown in Figs. 11 and 12. These slots extend longitudinally of the sleeve for a short distance and then are directed at an angle in order to provide cams for turning the sleeve as will presently be described.

The operating mechanism for actuating some of the movable mold members includes a transverse carrier plate 59 which is secured to the shaft 35 by means of a pin 60. Stops 61 are provided on the platen 31 to limit the movement of the carrier plate 59 in one direction. Stops 62 are provided on the carrier plate 59 for engagement with the plate 41 when in the position shown in Fig. 8.

The carrier plate 59 is provided with a plurality of dogs or spacing members 63 which are pivoted to the corners being mounted on pivots 64 and are recessed into the plate as shown in Fig. 14 so that the walls 65 of the recess tend to limit the inward movement of the free ends of the dogs.

The outer ends 66 of these dogs are adapted to engage with the plate 41 and hold the same in spaced relation to the plate 59 as shown in Fig. 14. These dogs are shouldered to provide forwardly extending projections 67 which are engaged at times by cam plates 68 secured to the connecting bars 34 as by means of bolts 69. These cams are also shouldered so that the extending portions will engage at times with the ends of extensions 67 to swing the dogs out of spacing position. The dogs are further guided by means of guide strips 70 which are also secured to the bars 34 and engage with the outer edges of the dogs.

Guide or holding pins 71 have their heads secured between the plates 41 and 52 and extend through holes or bearings 72 in the front plate 33. Other guide pins 73 are secured in the stationary plate 74 in which the die member 27 is mounted and slidably engage with holes 75 in the front plate 33 as shown.

When a cap is to be molded, the mold is closed as shown in Fig. 5 and the molding material is injected through the orifice 30 and completely fills the mold as indicated, thus forming the cap and is quickly hardened to retain the desired shape. It will be understood that the usual means are provided for heating or cooling the molding material as desired. When the material has sufficiently set or hardened, the die plate 25 is drawn away from the front plate 24 and causes the following actions of the movable die members. With the first rearward movement of the mold 26, the cap 15 is drawn out of the cavity 28 but remains in position on the movable die members as shown in Fig. 6. As the moving die plate moves backwardly, the shaft 35 strikes the stop or ejector plate 37 and prevents any further movement of the carrier plate 59 and parts controlled thereby which include the plate 41 and sleeve 39. As the platen and carriage members continue to move backwardly, the tube 47 is drawn away from the lugs 44 to permit the sleeve 43 to be turned. During this movement, the pins 57 move along the longitudinal portions of the slots 58 and with the further movement, the pins engage with the angular portions of the slots and cause the sleeve 43 to be turned a sufficient distance to cause the lugs 44 to disengage the lugs 21 on the formed cap as shown in Figs. 7 and 11. During this turning movement, the projections 19 on the formed cap have been formed in the groove 40 of the mold preventing the cap from turning and thus permits the release thereof from the mold lugs.

The further rearward movement of the platen 31 and the parts connected therewith causes the cams 68 to strike the projecting ends 67 of the dogs 63 and swing the dogs outwardly as shown in Fig. 7, thereby moving the spacing portions of the dogs out of position and permitting the transverse plate 41 to approach the carrier plate 59 as shown in Fig. 8. This movement disengages all of the movable mold members from the formed cap which is temporarily in the position shown in Fig. 8 and ready to drop off from the end of the shaft 35, thus completing the forming operation.

When the movable mold members are to be returned to original position, the platen 31 is again moved forward by the moving die plate 25 and the dogs 63 are forced inwardly by the guide strips 70 and force the transverse plate forwardly and lock it in spaced position as shown in Fig. 5. The pins 57 again rotate the sleeve 43 to move the lugs 45 back into forming position and the slots 46 in the end of the tube 47 embrace these lugs and thus place all of the movable mold parts finally in the filling position as shown particularly in Fig. 5.

In machines which we have made in accordance with this invention, the forming processes are rapidly carried out with large production of caps. While we have shown a single cavity machine, most of the machines which we have used are of multiple cavity as for instance, having eight recesses with coacting movable mold parts whereby the production is greatly increased.

While we have shown and described our invention with particular reference to caps, it will be apparent that the principles embodied in the same may be utilized for making other forms of articles, and therefore we do not wish to be limited to the exact construction or arrangements shown.

What we claim is:

1. A molding apparatus having a stationary mold member with a cavity therein corresponding to the outer surface of the article to be molded and a movable mold member adapted to coact with the cavity to form a molding space, said movable member including a central shaft, a sleeve slidably mounted on the shaft and having non-circular shaped recesses in the end thereof, a second sleeve slidably and rotatably mounted on the first named sleeve and having outwardly extending lugs with transverse grooves in the outer surfaces thereof for forming portions of the mold cavity, a tube around the last named sleeve having recesses in the ends thereof adapted to fit closely over the lugs to close the ends of the transverse grooves, a carriage for the movable mold members, means for holding the tube in said carriage, said means including a ring which coacts with the tube to close the mold cavity, and means for actuating said movable mold members whereby said lugs on the sleeve will be released from the projections which may have been formed in the article being molded.

2. In a molding apparatus, the combination with a molding machine, of a mold member secured to the front die plate of the machine and having a cavity therein conforming to the outer shape of the article to be formed, means for injecting plastic molding material into the cavity, a platen secured to the movable die plate of the machine, a front plate, bars connecting the platen with the front plate, a shaft slidably mounted in the platen which is adapted to engage a fixed ejector plate on the machine and which extends forwardly into the mold cavity when in forming position, a sleeve fitting over the forward end of the shaft and flush with the end of the shaft when in forming position, said sleeve having grooves in the end thereof forming part of the mold cavity, a transverse plate slidably mounted on the shaft and secured to said sleeve, a second sleeve slidably and rotatably mounted on the first named sleeve with the front end flush with the end of the first named sleeve, a plurality of lugs extending outwardly from the forward end of the last named sleeve, and provided with transverse grooves on their outer faces, a tube around the last named sleeve having recesses which fit closely over said lugs when the mold is closed thereby forming mold cavities for receiving the molding material for forming parts on the article to be made, means for securing the tube to the front plate, said means including a ring coacting with the sleeve to close the mold cavity, pins extending inwardly from the tube and engaging with slots in the second named sleeve, said slots extending longitudinally for a predetermined distance and terminating in angular cam shaped portions for turning the second named sleeve, a carrier plate secured to the shaft adjacent to the platen, spacing dogs pivotally mounted on the carrier plate and adapted to coact with said transverse plate to hold them spaced apart at predetermined times, guide strips on the bars for guiding the dogs and cams mounted on the bars adapted to coact with projections on the dogs for swinging the dogs to releasing position during the final opening movement of the movable mold members.

3. A molding apparatus for making plastic can closures having rims with inwardly extending interrupted threads, including a mold member having a cavity conforming to the shape of the closure, means for injecting plastic material into the cavity, a relatively movable mold member adapted to be inserted in the cavity and conforming with the inner surface of the closure, said movable mold member including lugs having cavities for forming the interrupted threads which members are interlocked with threads when the closure has been formed, means for rotating said movable mold member with respect to the closure being formed, a sufficient distance to release the lugs from the interrupted threads formed in the closure, and coacting means for then withdrawing said movable mold member a sufficient distance to move the lugs away from and out of engagement with said closure being formed, the space between the interrupted threads being sufficient to permit such withdrawal of the lugs.

4. Equipment for forming molded articles having outer flanges with inwardly extending projections, including a mold member having a cavity conforming to the shape of the article, means for injecting plastic material into the cavity, a relatively movable mold member adapted to be inserted in the cavity and conforming with the inner surface of the article, said relatively movable mold member including lugs with cavities for forming said projections which members are interlocked with the projections when the article has been formed, coacting mold members having recesses to engage with said lugs and close the ends of the recesses in said lugs, means for reciprocating the last named member to withdraw it from the lugs, means for turning the first named mold member to release the lugs from the finished projections and means for withdrawing the relatively movable mold member from the finished projections.

GEORGE W. EMMERT.
RAYMOND J. OLSON.

REFERENCES CITED

The following references are of record in the file of this patent:

UNITED STATES PATENTS

| Number | Name | Date |
|---|---|---|
| 2,327,665 | Peat | Aug. 24, 1943 |
| 2,404,631 | Gronemeyer | July 23, 1946 |

FOREIGN PATENTS

| Number | Country | Date |
|---|---|---|
| 256,897 | Great Britain | Aug. 19, 1926 |
| 497,496 | Great Britain | Dec. 21, 1938 |